United States Patent
Kim

(10) Patent No.: US 10,800,432 B2
(45) Date of Patent: Oct. 13, 2020

(54) REAR-SIDE ALERT SYSTEM AND METHOD OF CONTROLLING SAME

(71) Applicant: MANDO CORPORATION, Gyeonggi-do (KR)

(72) Inventor: Jae Suk Kim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 16/392,657

(22) Filed: Apr. 24, 2019

(65) Prior Publication Data

US 2019/0329794 A1    Oct. 31, 2019

(30) Foreign Application Priority Data

Apr. 25, 2018  (KR) .................... 10-2018-0047863

(51) Int. Cl.
    *B60W 50/14*    (2020.01)
    *B60W 30/095*   (2012.01)

(52) U.S. Cl.
    CPC ........ *B60W 50/14* (2013.01); *B60W 30/0953* (2013.01); *B60W 30/0956* (2013.01); *B60W 2050/143* (2013.01)

(58) Field of Classification Search
    CPC ............. B60W 50/14; B60W 30/0953; B60W 30/0956; B60W 2050/143
    USPC ....................................................... 340/435
    See application file for complete search history.

(56) References Cited

U.S. PATENT DOCUMENTS

| | | | |
|---|---|---|---|
| 6,906,621 B2* | 6/2005 | Kore | G01S 13/931 340/436 |
| 10,363,944 B1* | 7/2019 | Yu | B60W 50/0097 |
| 2008/0084283 A1* | 4/2008 | Kalik | B60Q 9/00 340/435 |
| 2012/0130629 A1* | 5/2012 | Kim | B60W 30/0956 701/301 |

(Continued)

FOREIGN PATENT DOCUMENTS

| | | |
|---|---|---|
| JP | 2008-186170 | 8/2008 |
| KR | 10-2016-0078865 | 7/2016 |
| KR | 10-2016-0133257 | 11/2016 |

OTHER PUBLICATIONS

Office Action dated May 31, 2019 for Korean Application No. 10-2018-0047863 and its English machine translation by Google Translate.

(Continued)

*Primary Examiner* — Omar Casillashernandez
(74) *Attorney, Agent, or Firm* — Ladas & Parry, LLP

(57) ABSTRACT

Disclosed are a rear-side alert system and a method of controlling the same. The rear-side alert system may output an alert when there is a possibility of collision with an object detected in back of a host vehicle and determine a time point of the alert based on whether the object reaches a virtual alert deactivation line, so as to maintain the alert during a time interval in which there is the possibility of collision between the host vehicle and the object. Further, when the object does not pass through a boundary set on one side of the host vehicle, the rear-side alert system may set different alert the time points, thereby minimizing a time during which an unnecessary alert is output and improving reliability of the output of the alert by the rear-side alert system.

14 Claims, 12 Drawing Sheets

(56) References Cited

U.S. PATENT DOCUMENTS

| | | | | |
|---|---|---|---|---|
| 2013/0147654 A1* | 6/2013 | Choi | ................... | H01Q 25/00 |
| | | | | 342/70 |
| 2016/0016585 A1* | 1/2016 | Park | ................... | H04L 67/12 |
| | | | | 701/41 |
| 2017/0210384 A1* | 7/2017 | Doebbelin | ........ | B60W 30/0956 |
| 2018/0158337 A1* | 6/2018 | Koravadi | ............. | G05D 1/0238 |
| 2018/0233048 A1* | 8/2018 | Andersson | ............. | B60Q 5/006 |
| 2018/0370529 A1* | 12/2018 | Matsunaga | ........... | B60W 50/14 |
| 2019/0329794 A1* | 10/2019 | Kim | .................. | B60W 30/0953 |
| 2020/0064464 A1* | 2/2020 | Hiromitsu | ............... | G01S 7/415 |

OTHER PUBLICATIONS

Office Action dated Oct. 16, 2019 for Korean Application No. 10-2018-0047863 and its English machine translation by Google Translate.

\* cited by examiner

REAR-SIDE ALERT SYSTEM AND METHOD OF CONTROLLING SAME

CROSS REFERENCE TO RELATED APPLICATION

This application claims priority from Korean Patent Application No. 10-2018-0047863, filed on Apr. 25, 2018, which is hereby incorporated by reference for all purposes as if fully set forth herein.

BACKGROUND OF THE INVENTION

1. Field of the Invention

The present disclosure relates to a rear-side alert system and a method of controlling the rear-side alert system.

2. Description of the Prior Art

According to an increase in demands for safety and convenience of drivers together with the performance of vehicles, Driver Assist Systems (DASs) for supporting the control of driving or parking by the driver or performing control to prevent a collision of the host vehicle is provided.

The DASs control steering and braking of the host vehicle based on information acquired through a sensor mounted to the host vehicle or information transmitted/received through a communication module, so as to improve safety of the host vehicle and provide convenience to the driver who controls the host vehicle.

For example, the DASs may include Smart Cruise Control (SCC) for providing driving convenience to the driver, a Smart Parking Assist System (SPAS) for providing driving convenience to the driver, an Autonomous Emergency Braking (AEB) system for preventing a collision of the host vehicle, a Rear Cross Traffic Alert (RCTA) system, and a Blind Spot Detection (BSD) system.

Among the DASs, the RCTA system may determine a possibility of collision with an object located in back of the host vehicle and output an alert to prevent the collision with the object in back of the host vehicle.

At this time, the RCTA system mainly determines the possibility of collision with the object moving in a direction crossing a movement direction of the host vehicle in back of the host vehicle and outputs an alert.

That is, the RCTA system mainly determines the possibility of collision with an object in a direction different from the movement direction of the host vehicle, and thus there is a problem in which it is difficult to decide a time point at which an alert is output to prevent a collision. Further, since the possibility of collision between the host vehicle and the object may be changed according to the lapse of time, it may be difficult to set a time point for providing an alert to the driver and a time interval for outputting the alert.

SUMMARY OF THE INVENTION

An aspect of the present embodiments is to provide a rear-side alert system and a method of controlling the same which can efficiently controlling a time point and a time interval for outputting an alert for preventing a collision with an object moving in back of the host vehicle.

Another aspect of the present embodiments is to provide a rear-side alert system and a method of controlling the same which can output an alert for preventing a collision in consideration of a characteristic and a movement state of an object moving in back of the host vehicle.

In accordance with an aspect of the present disclosure, a rear-side alert system is provided. The rear-side alert system includes: at least one sensor mounted to a host vehicle to have a field of view of an exterior of the host vehicle; and a controller communicatively connected to the at least one sensor and configured to: generate a moving path of an object detected around the host vehicle by the at least one sensor; determine a possibility of collision between the host vehicle and the object, based on the moving path of the object and at least one of a first boundary set on one side of the host vehicle or a second boundary set on the other side of the host vehicle; output an alert when there is the possibility of collision between the host vehicle and the object; set an alert deactivation line spaced apart from the first boundary or the second boundary by a preset distance; and deactivate the alert, based on the alert deactivation line and at least one of a location or a movement speed of the object.

In accordance with another aspect of the present disclosure, a method of controlling a rear-side alert system is provided. The method of controlling a rear-side alert system includes: detecting an object moving around a host vehicle; generating a moving path of the object; determining a possibility of collision between the host vehicle and the object, based on the moving path of the object and at least one of a first boundary set on one side of the host vehicle or a second boundary set on the other side of the host vehicle; outputting an alert when there is the possibility of collision between the host vehicle and the object; setting an alert deactivation line spaced apart from the first boundary or the second boundary by a preset distance after outputting the alert, and deactivating the alert, based on the alert deactivation line and at least one of a location or a movement speed of the object According to the present embodiments, it is possible to efficiently control a time interval in which an alert for preventing a collision of a host vehicle is output by setting a deactivation time point of the alert based on whether an object moving in back of the host vehicle reaches a virtual alert deactivation line.

According to the present embodiments, it is possible to efficiently control a time interval in which an alert is output and preventing the output of an unnecessary alert by setting deactivation time points of the alert differently based on whether the object moving in back of the host vehicle passes through a boundary set on one side of the host vehicle.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1A:
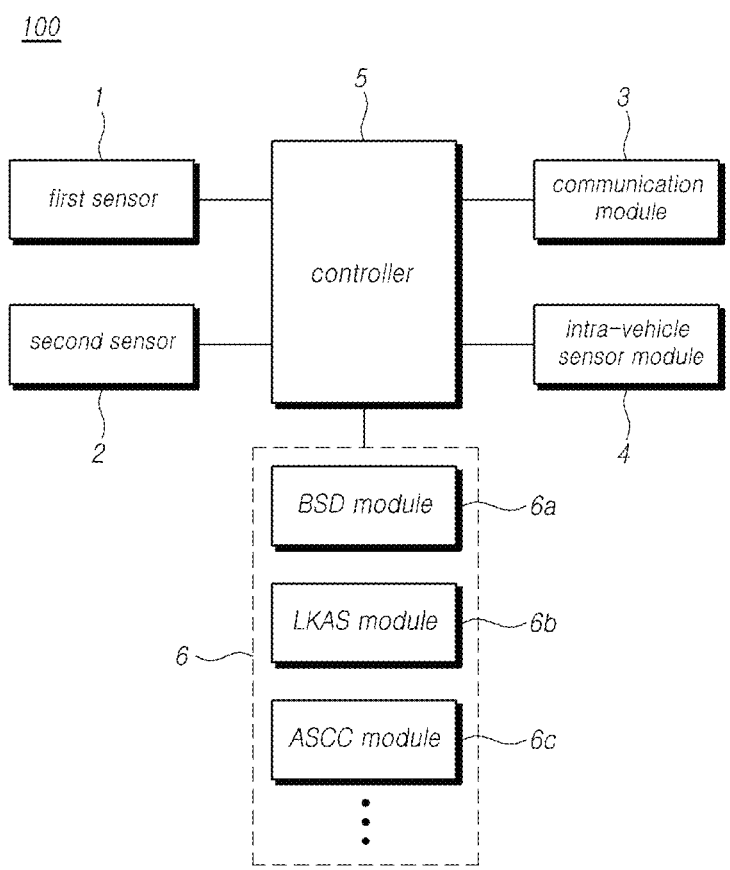
FIG. 1A illustrates a first embodiment of a rear-side alert system according to the present embodiments.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one component from other components, and the property, order, sequence and the like of the corresponding component are not limited by the corresponding term. In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1A illustrates a first embodiment of a rear-side alert system 100 according to the present embodiments.

The rear-side alert system 100 according to the present embodiments may include a first sensor 1, a second sensor 2, a communication module 3, an intra-vehicle sensor module 4, a controller 5 and a driver assist system module 6.

For example, the first sensor 1 may include an image sensor configured to have a field of view of an interior or an exterior of the host vehicle and capture image data and a processor configured to process the captured image data.

For example, the image sensor may be mounted to the host vehicle to have a field of view of an interior or an exterior of the host vehicle. At least one image sensor may be mounted to each part of the host vehicle to have a field of view of the front, side, or rear of the host vehicle.

The image sensor may include, for example, camera, LiDAR sensor.

Image information captured by the image sensor consists of image data and thus may refer to image data captured by the image sensor. Hereinafter, image information captured by the image sensor in the present disclosure means image data captured by the image sensor. The image data captured by the image sensor may be generated, for example, in one format of AVI, MPEG-4, H.264, DivX, and JPEG in a raw form.

The image data captured by the image sensor may be processed by a processor. The processor may operate to process the image data captured by the image sensor.

The processor may be implemented using at least one of electrical units for processing image data or performing other functions such as Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, and micro-processors in hardware.

Meanwhile, the second sensor 2 is a sensor module other than the first sensor 1 for capturing an image. For example, a plurality of second sensors 2 may be mounted to the host vehicle to have a sensing area of an interior or an exterior of the host vehicle to capture sensing data. The plurality of the second sensors 2 may include, for example, radar sensors, and ultrasonic sensors. The second sensor 2 may be omitted or the number thereof may be one or more.

The communication module 3 performs a function of performing communication between vehicles, communication between a host vehicle and infrastructure, communication between a host vehicle and a server, and communication inside a host vehicle. To this end, the communication module 3 may include a transmission module and a reception module. For example, the communication module 3 may include a broadcast reception module, a wireless Internet module, a short-range communication module, a location information module, an optical communication module, and a V2X communication module.

The broadcast reception module receives broadcast signals and/or broadcast-related information from external broadcast management servers through broadcasting channels. Here, the broadcast includes at least one of a radio broadcast and a TV broadcast. The wireless Internet module may be a module for wireless Internet access and may be mounted inside or outside the host vehicle. The short-range communication module is for short-range communication and may support short-range communication through at least one of Bluetooth™, Radio Frequency Identification (RFID), Infrared Data Association (IrDA), Ultra-Wideband (UWB), ZigBee, Near Field Communication (NFC), Wi-Fi, Wi-Fi Direct, and wireless Universal Serial Bus (USB).

The location information module is a module for acquiring location information of the host vehicle and representatively includes a Global Positioning System (GPS) module. For example, when a GPS module is used, the host vehicle may acquire the location of the host vehicle through a signal transmitted from a GPS satellite. Meanwhile, according to embodiments, the location information module may be an element included in the intra-vehicle sensor module 4 rather than an element included in the communication module 3.

The optical communication module may include an optical transmitter and an optical receiver. The optical transmitter and the optical receiver may convert a light signal into an electrical signal and transmit/receive information.

The V2X communication module is a module for performing wireless communication with a server, another vehicle, or an infrastructure device. The V2X communication module according to the present embodiment means an exchange of information between the host vehicle and objects, such as another vehicle, a module device, and a road, through a wired/wireless network, or technology itself therefor. The V2X communication module may include concepts of Vehicle to Vehicle (V2V), Vehicle to Infrastructure (V2I), Vehicle to Nomadic Device (V2N), and Vehicle to Pedestrian (V2P). The V2X communication module is based on Dedicated Short-Range Communications (DSRC), and may use Wireless Access in Vehicular Environment (WAVE), recently developed by IEEE or IEEE 802.11p communication technology, using a 5.9 GHz band, but is not limited thereto. It should be understood that V2X includes any vehicle-to-vehicle communication that does not exist at present but is to be developed in the future.

The intra-vehicle sensor module 4 is a sensor for sensing internal information of the host vehicle. For example, the intra-vehicle sensor module 4 may be a torque sensor for sensing steering torque, a steering angle sensor for sensing a steering angle, a motor location sensor for sensing information on a steering motor, a host vehicle speed sensor, a host vehicle motion detection sensor for sensing motion of the host vehicle, and a host vehicle position detection sensor. In addition, the intra-vehicle sensor module 4 may be a sensor for sensing various pieces of data inside the host vehicle and the number thereof may be one or more.

The controller 5 may acquire data from at least one of the first sensor 1, the second sensor 2, the communication module 3, and the intra-vehicle sensor module 4 and control various operations of the host vehicle based on the acquired data. Alternatively, the controller 5 may acquire image data from the first sensor 1 and process the image data. Further, the controller 5 may receive sensing data from the second sensor 2 and process the sensing data. Alternatively, the controller 5 may acquire data from the intra-vehicle sensor module 4 or the communication module 3 and process the data. For the processing, the controller 5 may include at least one processor.

The rear-side alert system 100 according to the present disclosure may be implemented through a combination of the above-described elements as necessary. For example, the rear-side alert system 100 includes the first sensor 1, the second sensor 2, and the controller 5. In another example, the rear-side alert system 100 includes the first sensor 1 and the controller 5. In still another example, the rear-side alert system 100 includes the second sensor 2 and the controller 5. However, the present disclosure is not limited thereto.

Specifically, the rear-side alert system 100 may include at least one second sensor 2 mounted to a host vehicle to have a field of view of an interior or an exterior of the host vehicle and configured to capture sensing data and process the captured sensing data and the controller 5 configured to perform an alert control of outputting or deactivating an alert according to a possibility of collision between the host vehicle and an object based on processing of the sensing data. The controller 5 may generate a moving path of an object detected around the host vehicle by the at least one sensor, determine the possibility of collision between the host vehicle and the object based on at least one of a moving path of the object detected around the host vehicle, a first boundary set on one side of the host vehicle, and a second boundary set on the other side of the host vehicle, output an alert when there is the possibility of collision between the host vehicle and the object, set an alert deactivation line spaced apart from the first boundary or the second boundary by a preset distance, and deactivate the alert, based on the alert deactivation line and at least one of a location and a movement speed of the object.

The controller 5 may deactivate the alert when it is detected that the object reaches the alert deactivation line after outputting the alert.

The controller 5 may calculate a time point at which the object reaches the alert deactivation line based on the movement speed of the object at a moment when the object passes through the first boundary or the second boundary after outputting the alert, and deactivate the alert at the calculated time point.

The controller 5 may deactivate the alert when the object does not pass through the first boundary or the second boundary within a preset time after outputting the alert.

The controller 5 may set the alert deactivation line when the object passes through the first boundary or the second boundary within a preset time after outputting the alert.

The controller 5 may set the alert deactivation line by increasing or decreasing the preset distance according to a length of the detected object.

In addition, the controller 5 may control the operation of at least one of the first sensor 1, the second sensor 2, the communication module 3, and the intra-vehicle sensor module 4. The controller 5 may control the operation of various driver assist systems included in the host vehicle.

Alternatively, the controller 5 may transmit/receive data to/from at least one of the first sensor 1, the second sensor 2, the communication module 3, the intra-vehicle sensor module 4, and the driver assist system module 6 and process the data received therethrough. That is, the controller 5 may be included within the host vehicle and communicate with at least one module mounted into the host vehicle. To this end, the controller 5 may further include an appropriate data link or communication link such as a host vehicle network bus for data transmission or signal communication.

Meanwhile, the controller 5 may perform all of the functions of controlling the host vehicle by generating outputs to a steering control module, a brake control module, and an Adaptive Driving Assistance System (ADAS) module.

The ADAS module may be the implementation of a module by various driver assist systems, and the driver assist systems may include, for example, an Autonomous Emergency Braking (AEB) system for preventing a collision of the host vehicle, a Rear Cross Traffic Alert (RCTA) system, a Smart Parking Assistance System (SPAS), a Blind Spot Detection (BSD) system, an Adaptive Cruise Control (ACC) system, a Lane Departure Warning System (LDWS), a Lane Keeping Assist System (LKAS), and Lane Change Assist System (LCAS). However, The terms and names of the driver assist systems described herein are only for examples and are not limited thereto. The driver assist system modules 6 may include an autonomous driving module for autonomous driving.

Figure 1B:
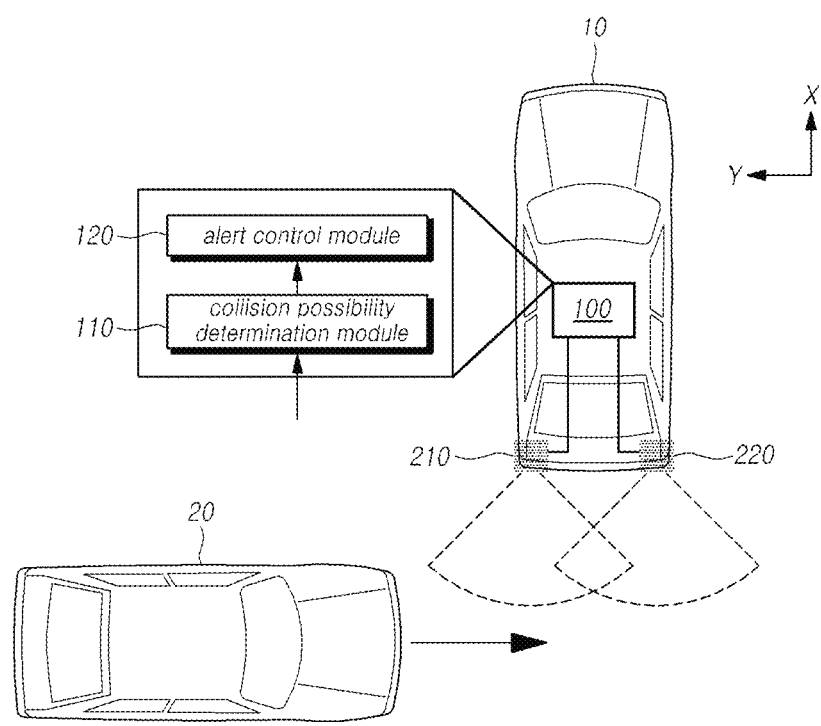
FIG. 1B illustrates a second embodiment of the rear-side alert system according to the present embodiments and an example of a situation in which the rear-side alert system operates.

FIG. 1B illustrates a second embodiment of the rear-side alert system 100 according to the present embodiments and an example of a situation in which the rear-side alert system operates.

Referring to FIG. 1B, a first vehicle 10 may be a vehicle equipped with the rear-side alert system 100 according to the present embodiments and be mentioned as a "host vehicle" or a "traveling vehicle" in this specification. A second vehicle 20 may be a vehicle to be detected by the rear-side alert system 100 and be mentioned as a "target vehicle" in this specification.

In this specification, a direction which is the same as a traveling direction of the first vehicle 10 is indicated as an X direction and a direction which crosses the X direction is indicated as a Y direction for convenience of description, but are not limited thereto.

The first vehicle 10 equipped with the rear-side alert system 100 according to the present embodiments detects the second vehicle 20 moving in back of the first vehicle 10 through detection sensors 210 and 220 mounted to the rear part. The detection sensors 210 and 220 may be various sensors such as radar sensor and ultrasound sensors and one or more thereof may be mounted to the rear part of the host vehicle.

The rear-side alert system 100 according to the present embodiments may determine whether there is a possibility of collision between the first vehicle 10 and the second vehicle 20 detected through the detection sensors 210 and 220, and when there is the possibility of collision between the first vehicle 10 and the second vehicle 20, outputs an alert and allows a driver to avoid the collision. Alternatively, when there is the possibility of collision between the host vehicle and the object, the rear-side alert system 100 may prevent the collision of the first vehicle 10 by controlling a steering device or a braking device of the first vehicle 10, but a method of outputting an alert to prevent the collision is described by way of example in this specification.

The rear-side alert system 100 according to the present embodiments may include a collision possibility determination module 110 for determining a possibility of collision between the first vehicle 10 and the second vehicle 20, and an alert control module 120 for outputting an alert when there is the possibility of collision. The elements may be implemented as an Electronic Control Unit (ECU) or two or more elements may be integrated to one module.

The collision possibility determination module 110 may determine the possibility of collision between the first vehicle 10 and the second vehicle 20 based on information acquired through the detection sensors 210 and 220.

For example, the collision possibility determination module 110 may set a predetermined area as an alert area based on the location of the first vehicle 10 and determine whether there is the possibility of collision within the set alert area.

Further, the collision possibility determination module 110 may determine the possibility of collision in consideration of whether the second vehicle 20 is moving, whether a moving path of the first vehicle 10 crosses a moving path of the second vehicle 20, and an expected time of the collision between the first vehicle 10 and the second vehicle 20.

In addition, the collision possibility determination module 110 may determine the possibility of collision between the first vehicle 10 and the second vehicle 20 in consideration of an angle formed between the moving path of the first vehicle 10 and the moving path of the second vehicle 20.

The collision possibility determination module 110 may use a reference line or one or more boundaries which are set in an X direction from the first vehicle 10 in order to determine the possibility of collision between the first vehicle 10 and the second vehicle 20. That is, when determining whether the moving path of the first vehicle 10 crosses the moving path of the second vehicle 20 or whether there is the possibility of collision, the reference line or the boundaries may be used.

When the collision possibility determination module 110 determines that there is the possibility of collision between the first vehicle 10 and the second vehicle 20, the alert control module 120 may output an alert and allow the driver to avoid the collision.

When a predetermined time passes from the output of the alert, the alert control module 120 may deactivate the alert.

Alternatively, after outputting the alert, the alert control module 120 may control a time point for deactivating the alert in consideration of a movement state of the second vehicle 20.

For example, when the second vehicle 20 does not cross the moving path of the first vehicle 10 while the predetermined time passes after the alert is output, the alert control module 120 may deactivate the alert. That is, when it is identified that the second vehicle 20 has not moved through a path having a collision risk for the predetermined time although the collision risk is detected, the alert control module 120 may deactivate the alert.

In another example, when the alert is output and the second vehicle 20 crosses the moving path of the first vehicle 10, the alert control module 120 may determine a time point for deactivating the alert based on whether the second vehicle 20 reaches a predetermined point.

Whether the second vehicle 20 reaches the predetermined point may be detected through the detection sensors 210 and 220 mounted to the first vehicle 10 and the alert may be deactivated. Alternatively, a time point at which the second vehicle 20 reaches the predetermined point may be expected based on a movement speed of the second vehicle 20 and an alert output at the expected time point may be deactivated.

That is, in the state in which the second vehicle 20 crosses the first vehicle 10, a time point for deactivating the alert may be determined based on a state in which the collision risk between the first vehicle 10 and the second vehicle 20 is completely removed.

Hereinafter, a method by which the rear-side alert system 100 according to the present embodiments outputs an alert will be described in detail with reference to FIGS. 2A to 5, and a method of deactivating the alert will be described in detail with reference to FIGS. 6 to 8.

Figure 2A:
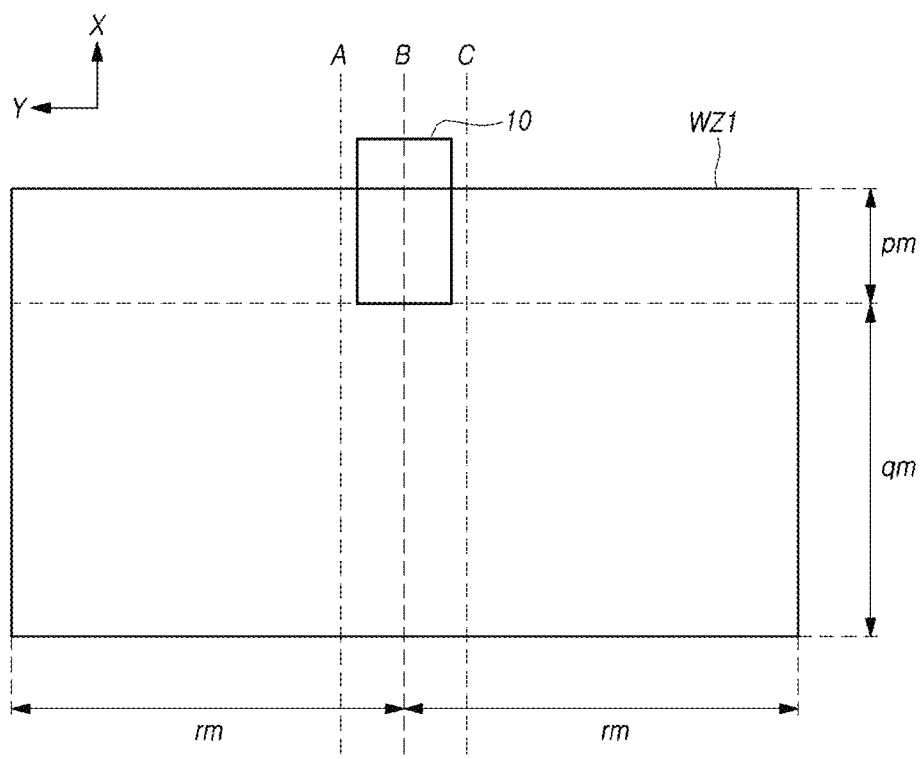
FIGS. 2A and 2B illustrate an example of an alert area set by the rear-side alert system according to the present embodiments.
Figure 2B:
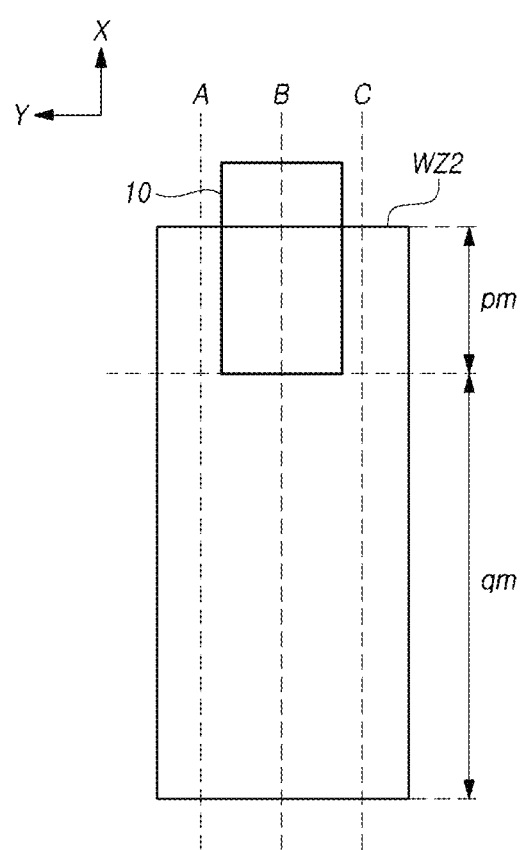

FIGS. 2A and 2B illustrate an example of a method by which the rear-side alert system 100 according to the present embodiments sets an alert area.

Referring to FIG. 2A, the collision possibility determination module 110 of the rear-side alert system 100 according to the present embodiments may set an area corresponding to a predetermined distance in an X direction and a Y direction from the location of the first vehicle 10 as a first alert area (WZ1).

The rear-side alert system 100 is a system for detecting a collision risk in back of the first vehicle 10, and thus the collision possibility determination module 110 may set an area corresponding to the part (for example, pm) on the side surface of the first vehicle 10 in the X direction and an area spaced apart from the rear part of the first vehicle 10 by a predetermined distance (for example, qm) as the first alert area (WZ1).

The rear-side alert system 100 may set a Y direction area using a boundary A, a reference line B, and a boundary C set based on the first vehicle 10. For example, areas spaced apart from the reference line B by a predetermined distance (for example, r m) may be set as the first alert area (WZ1).

That is, when there is the collision risk within the set first alert area (WZ1), the rear-side alert system 100 may output an alert and allow the driver to avoid the collision.

Alternatively, the rear-side alert system 100 may output the alert for the collision risk which may be generated in back of the first vehicle 10 and the collision risk may be most frequently generated in an area that matches the moving path of the first vehicle 10, so that the collision possibility determination module 110 may set the alert area only in the X direction in order to increase accuracy of the output of the alert.

Referring to FIG. 2B, the collision possibility determination module 110 of the rear-side alert system 100 according to the present embodiments may set an area corresponding to a predetermined distance in an X direction from the location of the first vehicle 10 as a second alert area (WZ2).

For example, the collision possibility determination module 110 may set an area corresponding to the part (for example, pm) on the side surface of the first vehicle 10 and an area spaced apart from the rear part of the first vehicle 10 by a predetermined distance (for example, qm) as the second alert area (WZ2). Further, when there is the collision risk in the second alert area (WZ2), the alert may be output.

That is, by limiting the alert area based on the area having the high possibility of collision in back of the first vehicle 10, accuracy of the output of the alert for minimizing the generation of unnecessary alerts and preventing the collision may be improved.

The collision possibility determination module 110 may determine the possibility of collision only for an object moving in back of the first vehicle 10. That is, when a speed of the object detected through the detection sensors 210 and 220 is included in a predetermined range, the possibility of collision may be determined. The possibility of collision may not be determined for a stopped object.

The collision possibility determination module 110 may determine the possibility of collision based on the moving path of the first vehicle 10 and the moving path of the second vehicle 20 detected through the detection sensors 210 and 220.

Figure 3:
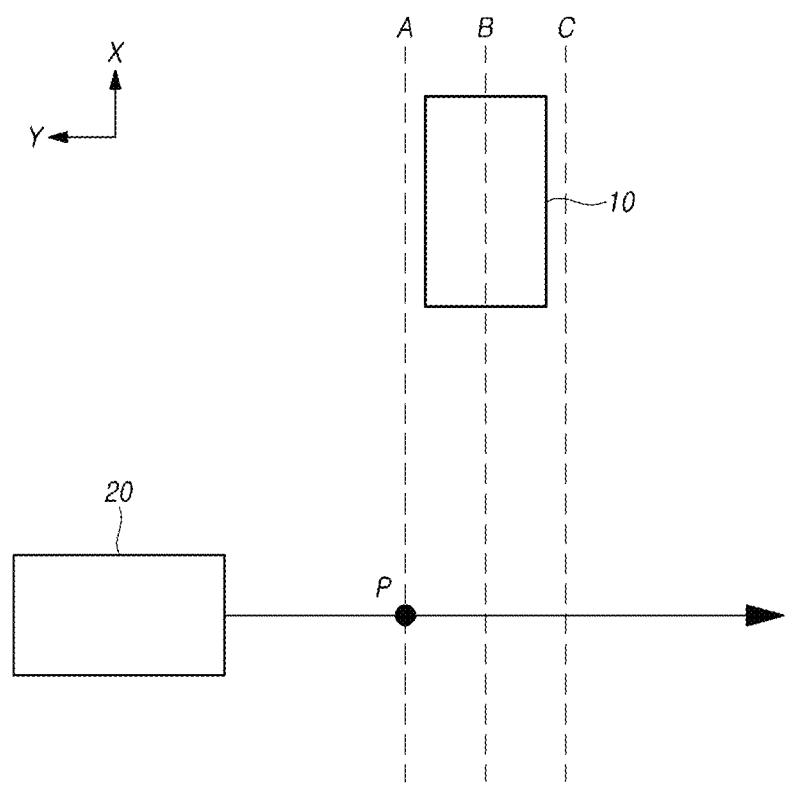
FIGS. 3 to 5 illustrate an example of a method by which the rear-side alert system determines an output of an alert according to the present embodiments.

Referring to FIG. 3, the collision possibility determination module 110 of the rear-side alert system 100 according to the present embodiments determines whether there is an intersection between at least one of the boundary A, the reference line B, and the boundary C of the first vehicle 10 and the moving path of the second vehicle 20.

For example, the collision possibility determination module 110 determines whether there is an intersection P between the boundary A set based on the first vehicle 10 and the moving path of the second vehicle 20.

The intersection may be determined as a point at which the reference line B of the first vehicle 10 crosses the moving path of the second vehicle 20 or a point at which the boundary C crosses the moving path of the second vehicle 20 according to an approach direction of the second vehicle 20.

Alternatively, whether there is the possibility of collision between the first vehicle 10 and the second vehicle 20 may be determined based on whether there is the intersection between two or more of the boundary A, the reference line B, and the boundary C, and the moving path of the second vehicle 20.

Meanwhile, it may be determined that there is the possibility of collision only when an angle formed by the moving paths of the two vehicles is larger than or equal to a predetermined angle although there is the intersection between the moving path of the first vehicle 10 and the moving path of the second vehicle 20.

Figure 4:
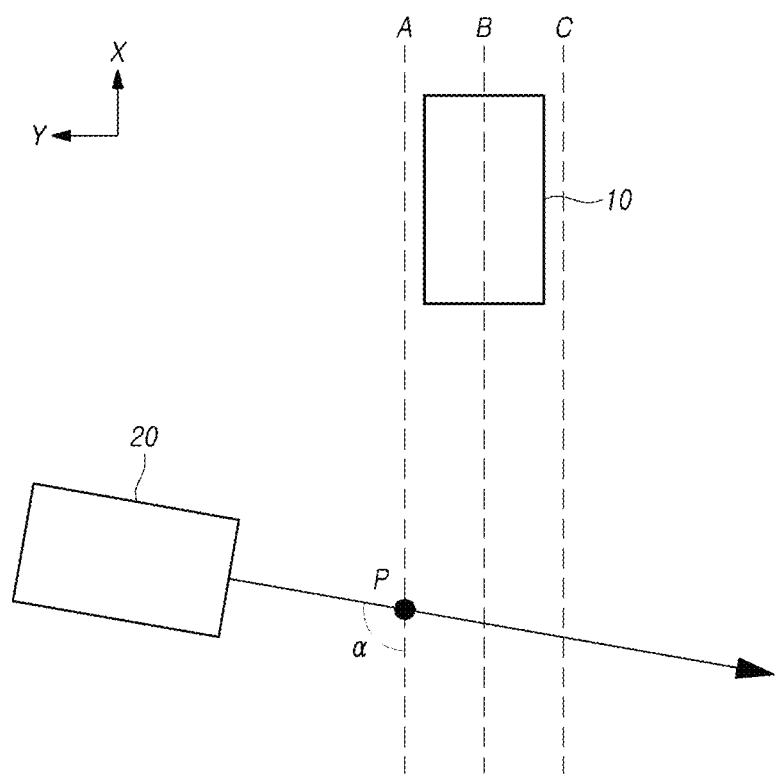

Referring to FIG. 4, the collision possibility determination module 110 of the rear-side alert system 100 according to the present embodiments may determine there is the possibility of collision between the first vehicle 10 and the second vehicle 20 when the angle formed by the moving path of the first vehicle 10 and the moving path of the second vehicle 20 is larger than or equal to a predetermined angle (for example, α).

This is in case the accurate detection for the second vehicle 20 is not performed when the second vehicle 20 approaches the first vehicle 10 in an area equal to or smaller than a predetermined angle, and the possibility of collision with respect to the second vehicle 20 which approaches in a range of all angles may be determined according to the number of performance of the detection sensors 210 and 220 mounted to the first vehicle 10.

The collision possibility determination module 110 may determine the possibility of collision between the first vehicle 10 and the second vehicle 20 based on whether there is the intersection between the moving path of the first vehicle 10 and the moving path of the second vehicle 20 in the alert area set based on the first vehicle 10 as described above.

Further, the collision possibility determination module 110 may output the alert for the driver of the first vehicle 10 in consideration of an expected time of the collision between the first vehicle 10 and the second vehicle 20. At this time, whether to output the alert may be determined according to a movement speed of the second vehicle 20.

Figure 5:
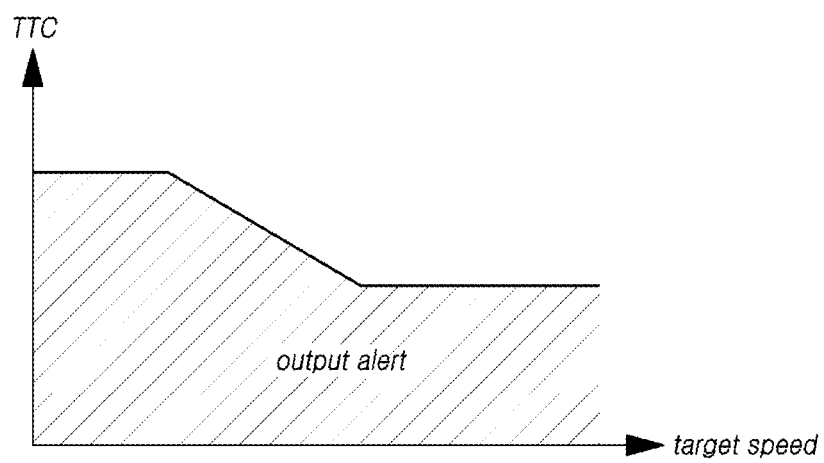

Referring to FIG. 5, the alert control module 120 may determine whether to output the alert in consideration of a Time To Collision (TTC) between the first vehicle 10 and the second vehicle 20 and the movement speed of the second vehicle 20.

For example, when the speed of the second vehicle 20 is slow, the alert may be output up to a range in which the TTC between the first vehicle 10 and the second vehicle 20 is long. When the speed of the second vehicle 20 is fast, the alert may be output up to a range in which the TTC between the first vehicle 10 and the second vehicle 20 is short.

That is, since the TTC of the second vehicle 20 varies depending on the movement speed of the second vehicle 20, the alert may be output when the collision between the first vehicle 10 and the second vehicle 20 is expected in consideration of the TTC.

The alert control module 120 may output the alert and allow the driver to avoid the collision when the collision is expected in back of the first vehicle 10 based on the possibility of collision determined by the collision possibility determination module 110.

After outputting the alert, the alert control module 120 may deactivate the alert when a predetermined condition is satisfied.

For example, the alert control module 120 may deactivate the alert when a predetermined time (for example, 1 second) passes after the alert is output. However, if whether to deactivate the alert is determined based on a predetermined time as described above, the alert may be deactivated at a time point at which the alert is needed according to the location or a movement state of the second vehicle 20. Alternatively, the alert may be maintained until the alert is not needed.

The alert control module 120 of the rear-side alert system 100 according to the present embodiments may set the time point in consideration of the movement state of the second vehicle 20 which is determined to have the possibility of collision with the first vehicle 10, thereby improving reliability of the output of the alert to avoid the collision.

Figure 6:
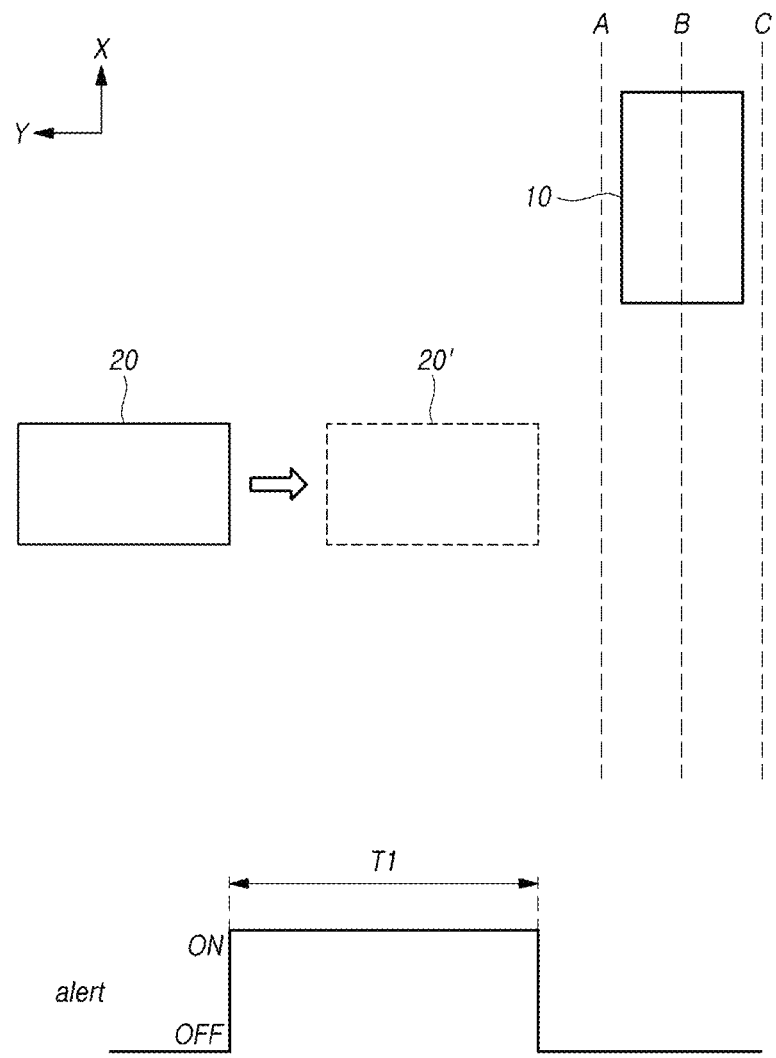
FIG. 6 illustrates a first example of a time point at which the rear-side alert system deactivates the alert according to the present embodiments.

FIG. 6 illustrates a first example of the time point at which the alert control module 120 of the rear-side alert system 100 according to the present embodiments deactivates the alert.

Referring to FIG. 6, the alert control module 120 of the rear-side alert system 100 according to the present embodiments outputs an alert when there is the possibility of collision with the second vehicle 20 moving in back of the first vehicle 10.

The alert control module 120 may set a time point for deactivating the alert according to whether the second vehicle 20 passes through the boundary A or the boundary C set based on the first vehicle 10.

For example, when the second vehicle 20 approaches in back of the boundary A of the first vehicle 10, the alert control module 120 may deactivate the alert at a time point at which a predetermined time T1 passes if the second vehicle 20 does not pass through the boundary A until the predetermined time T1 passes.

Alternatively, when the second vehicle 20 approaches in back of the boundary C of the first vehicle 10, the alert control module 120 may deactivate the alert at a time point at which a predetermined time T1 passes if the second vehicle 20 does not pass through the boundary C until the predetermined time T1 passes.

That is, if the second vehicle 20 does not pass through the boundary set on one side of the first vehicle 10 until the predetermined time T1 passes even though it is determined that there is the possibility of collision with the second vehicle 20 detected in back of the first vehicle 10, it may be determined that the collision risk is removed.

Accordingly, if the second vehicle 20 does not pass through the boundary A or the boundary C within the predetermined time T1 according to an approach direction of the second vehicle 20, the alert may be deactivated and thus the unnecessary alert may not be continuously maintained.

Further, the collision risk may be notified to the driver of the first vehicle 10 by maintain the alert for the predetermined time T1 after the possibility of collision is detected.

As described above, the alert control module 120 may deactivate the alert after the predetermined time T1 passes when the second vehicle 20 does not pass through the boundary set on one side of the first vehicle 10 and may set the deactivation time point of the alert according to the movement state of the second vehicle 20 when the second vehicle 20 has passed through the boundary.

That is, since the case in which the second vehicle 20 has passed through the boundary set on one side of the first vehicle 10 corresponds to the state in which the second vehicle 20 enters an area having a high collision risk, the alert may be deactivated after it is identified whether the possibility of collision is completely removed.

Figure 7:
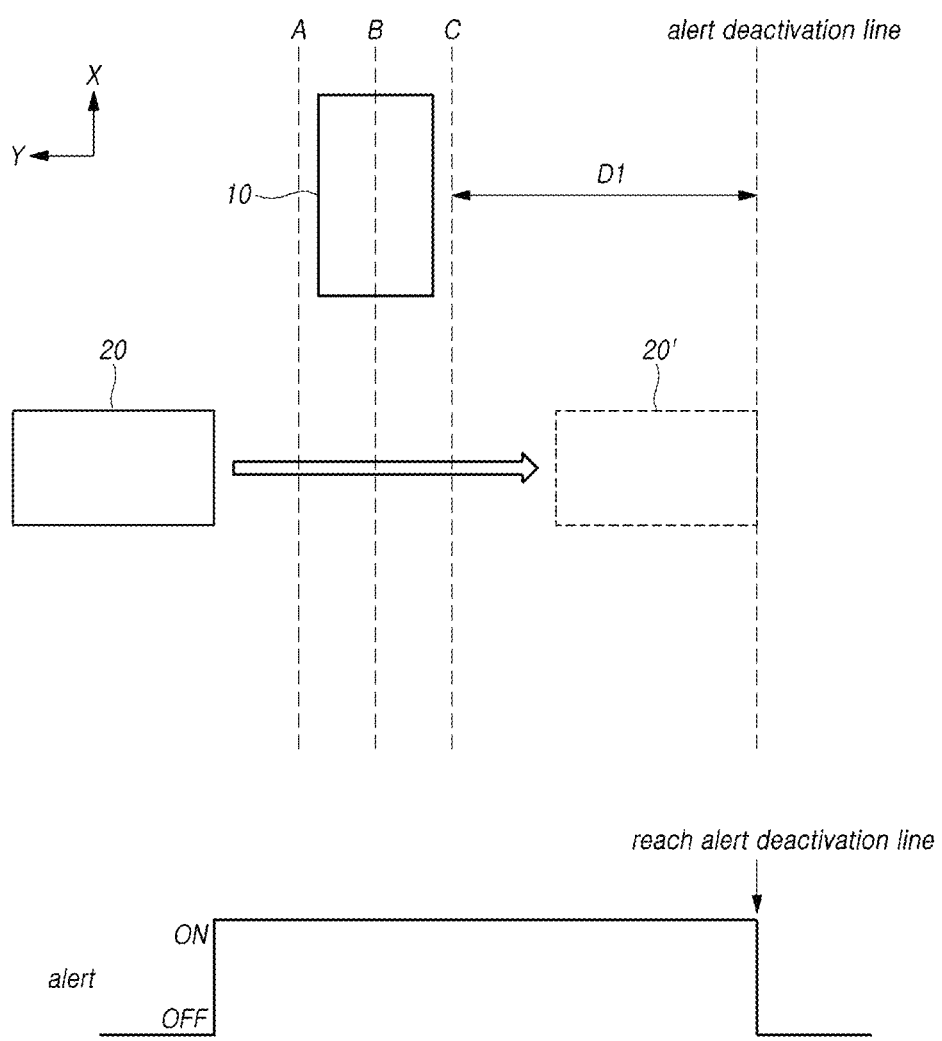
FIG. 7 illustrates a second example of the time point at which the rear-side alert system deactivates the alert according to the present embodiments.

FIG. 7 illustrates a second example of the time point at which the alert control module 120 of the rear-side alert system 100 according to the present embodiments deactivates the alert.

Referring to FIG. 7, the alert control module 120 may set a virtual alert deactivation line at a point spaced apart from the boundary set on one side of the first vehicle 10 by a predetermined distance D1.

For example, when the second vehicle 20 approaches from the boundary A of the first vehicle 10, the virtual alert deactivation line may be set at a point spaced apart from the boundary C by the distance D1. Alternatively, when the second vehicle 20 approaches from the boundary C of the first vehicle 10, the virtual alert deactivation line may be set on a point spaced apart from the boundary A by the distance D1.

Alternatively, the alert deactivation line may be set at a point spaced apart from a boundary adjacent to an area which the second vehicle 20 approaches by the distance D1.

Alternatively, the virtual alert deactivation line may be set at a point opposite the area which the second vehicle 20 approaches among points spaced apart from the reference line B by the predetermined distance D1.

When it is identified that the second vehicle 20 passes the boundary A or the boundary C after the alert is output, the alert control module 120 may determine the deactivation time point of the alert based on whether the second vehicle 20 reaches the alert deactivation line.

For example, when the second vehicle 20 passes the boundary A, the alert control module 120 detects the second vehicle 20 through the detection sensors 210 and 220 mounted to the first vehicle 10. When it is identified that the detected second vehicle 20 reaches the alert deactivation line, the alert may be deactivated.

The alert may be deactivated based on whether the front part of the second vehicle 20 reaches the alert deactivation line. Alternatively, the alert may be deactivated based on whether the rear part of the second vehicle reaches the alert deactivation line.

When the alert control module 120 determines whether the front part of the second vehicle 20 reaches the alert deactivation line, the distance D1 between the boundary C and the alert deactivation line may be set such that a distance between the rear part of the second vehicle 20 and the boundary C is longer than or equal to a predetermined distance.

In another example, when the second vehicle 20 passes through the boundary A, the alert control module 120 detects the movement speed of the second vehicle 20 at a time point at which the second vehicle 20 passes through the boundary A. Further, a time point at which the second vehicle 20 reaches the alert deactivation line is calculated based on the movement speed at the time point at which the second vehicle 20 passes through the boundary A and the distance between the boundary A and the alert deactivation line.

The alert control module 120 may maintain the alert during a time interval between the time point at which the second vehicle 20 passes through the boundary A and the time point at which it is expected that the second vehicle 20 reaches the alert deactivation line.

That is, the time point at which the second vehicle 20 reaches the alert deactivation line is calculated based on the movement speed at the time point at which the second vehicle 20 passes through the boundary A and a time during which the alert is maintained may be determined.

This may allow the alert to be maintained up to the time point at which the second vehicle 20 reaches the alert deactivation line based on the movement speed detected at the time point at which the second vehicle 20 passes through the boundary A when it is difficult to detect the reaching the alert deactivation line by the second vehicle 20 through the detection sensors 210 and 220 mounted to the first vehicle 10.

As described above, the rear-side alert system 100 according to the present embodiments may output the alert while there is the collision risk between the first vehicle 10 and the second vehicle 20 as the alert control module 120 determines the deactivation time point of the alert in consideration of the movement state of the second vehicle 20 in which the collision risk is detected.

Further, the alert control module 120 may set different alert deactivation time points according to whether the second vehicle 20 passes through the boundary line set on one side of the first vehicle 10 or whether the second vehicle 20 reaches the alert deactivation line, thereby minimizing a time interval in which the unnecessary alert is output and improving reliability of the output of the alert.

Meanwhile, the alert control module 120 may set different deactivation time points of the alert in consideration of the length of the second vehicle 20 as well as the location and the movement state of the second vehicle 20.

Figure 8:
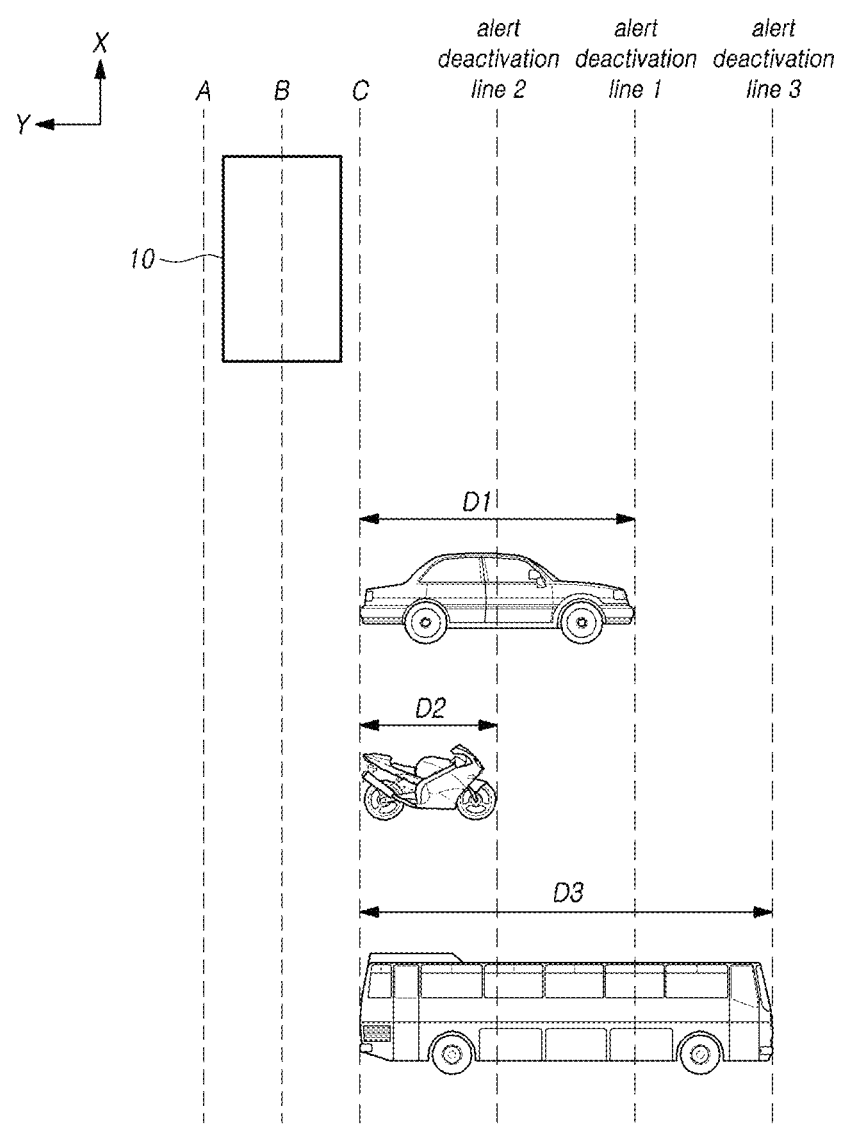
FIG. 8 illustrates a third example of the time point at which the rear-side alert system deactivates the alert according to the present embodiments.

FIG. 8 illustrates a third example of the time point at which the alert control module 120 of the rear-side alert system 100 according to the present embodiments deactivates the alert.

Referring to FIG. 8, when the second vehicle 20 determined to have the collision risk with the first vehicle 10 passes through the boundary set on one side of the first vehicle 10, the alert control module 120 may determine a deactivation time point of the alert based on whether the second vehicle 20 reaches the alert deactivation line.

At this time, the alert control module 120 may set the alert deactivation line at different points depending on the length of the detected second vehicle 20.

For example, when the second vehicle 20 is a sedan having a general length, the alert control module 120 may set alert deactivation line 1 at a point spaced apart from the boundary C by a distance D1. Alternatively, when the second vehicle 20 is a motorcycle having a relatively short length, the alert control module 120 may set alert deactivation line 2 at a point spaced apart from the boundary C by a distance D2. Alternatively, when the second vehicle 20 is a large vehicle such as a bus, the alert control module 120 may set alert deactivation line 3 at a point spaced apart from the boundary C by a distance D3.

The alert control module 120 may determine the deactivation time point of the alert based on whether the second vehicle 20 reaches alert deactivation lines 1, 2, and 3 set with respect to the second vehicle 20.

That is, when the length of the second vehicle 20 is short, the distance from the alert deactivation line may be shortened and thus a time during which the unnecessary alert is output may not be generated. Further, when the length of the second vehicle 20 is long, the distance from the alert deactivation distance may be increased and thus the alert may be maintained during a time interval in which there is the collision risk with the second vehicle 20.

As described above, even though the length of the second vehicle 10 varies, it is possible to maintain a predetermined distance between the rear part of the second vehicle 20 and the boundary C by setting different alert deactivation lines according to the length of the second vehicle 20.

Although the example of FIG. 8 illustrates the case in which the rear part of the second vehicle 20 is located on the boundary C, the alert deactivation line may be set such that the rear part of the second vehicle 20 is spaced apart from the boundary C by a predetermined distance.

Figure 9:
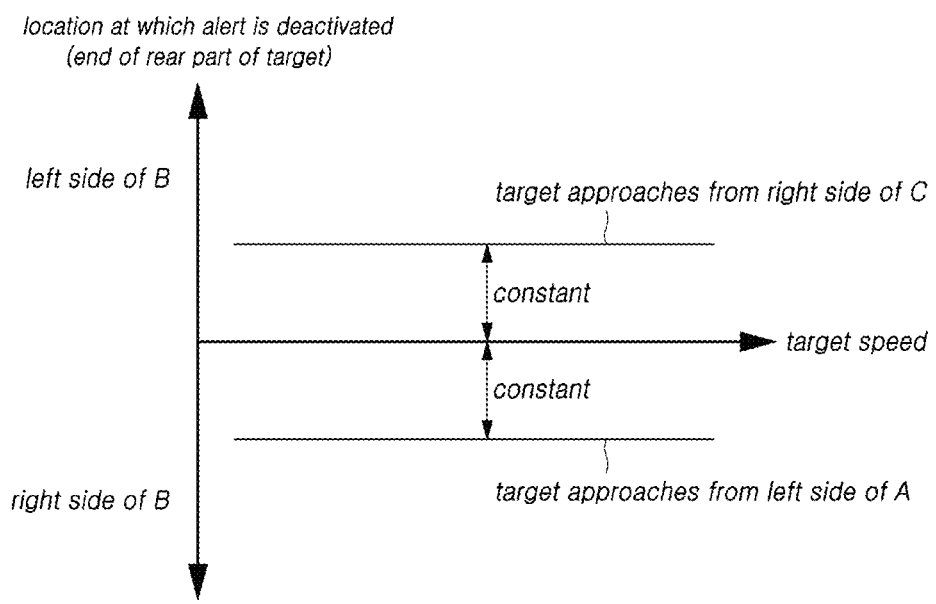
FIG. 9 illustrates an example of a location of a target vehicle at the time point at which the alert is deactivated by the rear-side alert system according to the present embodiments.

FIG. 9 illustrates an example of the location of the second vehicle 20 at a time point at which the alert output by the rear-side alert system 100 according to the present embodiments is deactivated.

Referring to FIG. 9, the second vehicle 20, that is, a target vehicle approaches the first vehicle 10 and thus an alert is output, and the location of the target vehicle at the time point at which the alert is deactivated is shown.

When the target vehicle approaches from the boundary A set on one side of the first vehicle 10, the alert is deactivated if the target vehicle reaches the alert deactivation line spaced apart from the boundary C set on one side of the first vehicle 10 by a predetermined distance.

Accordingly, the location of the end of the rear part of the target vehicle at the time point at which the alert is deactivated is spaced apart from the reference line B by a predetermined distance. Further, since the alert is deactivated based on whether the target vehicle reaches the alert deactivation line regardless of the speed of the target vehicle, the location of the end of the rear part of the target vehicle at the time point at which the alert is deactivated is constant even though the speed of the target vehicle is different.

When the target vehicle approaches from the boundary C set on one side of the first vehicle 10, the alert is deactivated if the target vehicle reaches the alert deactivation line spaced apart from the boundary A set on one side of the first vehicle 10 by a predetermined distance.

Accordingly, even when the target vehicle approaches from the boundary C, the end of the rear part of the target vehicle at the time point at which the alert is deactivated is located at a predetermined point regardless of the speed of the target vehicle.

As described above, when the target vehicle detected to have the possibility of collision with the first vehicle 10 passes through the boundary set on one side of the first vehicle 10, the alert may be deactivated when the target vehicle reaches the alert deactivation line and thus the alert may be maintained during the time interval in which there is the collision risk regardless of the length and the speed of the target vehicle.

Further, it is possible to improve reliability of the output of the alert and provide convenience to the driver by minimizing the time interval in which the unnecessary alert is output.

Figure 10:
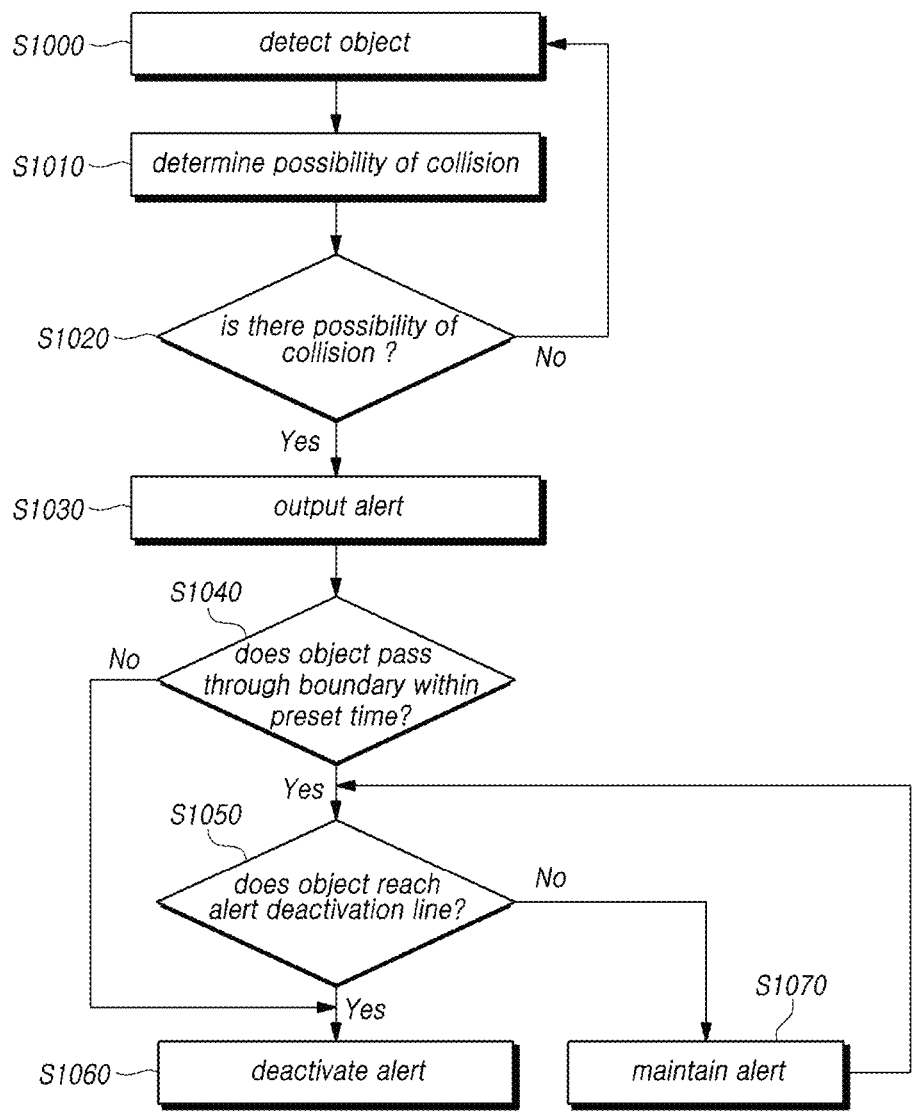
FIG. 10 is a flowchart illustrating an example of a process of a method of controlling the rear-side alert system according to the present embodiments.

FIG. 10 illustrates an example of a process of a method of controlling the rear-side alert system 100 according to the present embodiments.

Referring to FIG. 10, the rear-side alert system 100 according to the present embodiments detects an object moving in back of the host vehicle in S1000.

When the object is detected, the rear-side alert system 100 generates a moving path of the object and determines a possibility of collision between the host vehicle and the object, based on the moving path of the object and at least one of a first boundary set on one side of the host vehicle or a second boundary set on the other side of the host vehicle in S1010. When there is the possibility of collision between the host vehicle and the object in S1020, an alert is output in S1030.

After outputting the alert, the rear-side alert system 100 identifies whether the detected object passes through a boundary set on one side of the host vehicle in S1040.

When the detected object passes through the boundary set on one side of the host vehicle within a preset time, the rear-side alert system 100 identifies whether the detected object reaches the alert deactivation line in S1050.

For example, the rear-side alert system 100 may identify whether the object reaches the alert deactivation line through a sensor mounted to the host vehicle.

Alternatively, a time point at which the object reaches the alert deactivation line is calculated based on a movement speed of the object at a time point at which the object passes through the boundary set on one side of the host vehicle and a distance between the boundary and the alert deactivation line. It may be predicted that the object reaches the alert deactivation line at the calculated time point.

The rear-side alert system 100 deactivates the alert, based on the alert deactivation line and at least one of a location or a movement speed of the object at the detected or predicted time point at which the object reaches the alert deactivation line in S1060. The alert is maintained until the object reaches the alert deactivation line in S1070.

When the detected object does not pass through the boundary set on one side of the host vehicle within a preset time, the rear-side alert system 100 deactivates the alert at a time point at which the preset time passes in S1060. Accordingly, the unnecessary alert may not be output.

As described above, when it is determined that there is the possibility of collision between the host vehicle and the object detected in back of the host vehicle, the rear-side alert system 100 according to the present embodiments may output the alert and thus prevent the collision from being generated in back of the host vehicle.

Further, the rear-side alert system 100 may set different deactivation time points of the alert according to the location and the movement state of the detected object, so as to minimize a time during which the unnecessary alert is output and maintain the alert during the time interval in which there is the possibility of collision.

Accordingly, it is possible to improve reliability of the alert output by the rear-side alert system 100 and avoid the collision which may occur in back of the host vehicle, thereby providing convenience to the driver.

The above embodiments of the present disclosure have been described only for illustrative purposes, and those skilled in the art will appreciate that various modifications and changes may be made thereto without departing from the scope and spirit of the disclosure. Therefore, exemplary embodiments of the present disclosure have been described for the sake of brevity and clarity. The scope of the present disclosure shall be construed based on the accompanying claims in such a manner that all of the technical ideas included within the scope equivalent to the claims belong to the present disclosure.

What is claimed is:

1. A rear-side alert system comprising:
   at least one sensor mounted to a host vehicle to have a field of view of an exterior of the host vehicle; and
   a controller communicatively connected to the at least one sensor, the controller configured to:
   generate a moving path of an object detected around the host vehicle by the at least one sensor;
   determine a possibility of collision between the host vehicle and the object, based on the moving path of the object and at least one of a first boundary set on one side of the host vehicle or a second boundary set on the other side of the host vehicle;
   output an alert when there is the possibility of collision between the host vehicle and the object; set an alert deactivation line spaced apart from the first boundary or the second boundary by a preset distance; and
   deactivate the alert, based on the alert deactivation line and at least one of a location or a movement speed of the object.

2. The rear-side alert system of claim 1, wherein the controller is further configured to:
   determine the possibility of collision between the host vehicle and the object, based on the moving path of the object detected around the host vehicle and at least one of the first boundary or the second boundary; and
   output the alert when there is the possibility of collision between the host vehicle and the object, set the alert deactivation line spaced apart from the first boundary or the second boundary by the preset distance, and deactivate the alert, based on the alert deactivation line and at least one of the location or the movement speed of the object.

3. The rear-side alert system of claim 1, wherein the controller deactivates the alert when it is detected that the object reaches the alert deactivation line after outputting the alert.

4. The rear-side alert system of claim 1, wherein the controller calculates a time point at which the object reaches the alert deactivation line, based on the movement speed of the object at a moment when the object passes through the first boundary or the second boundary after outputting the alert, and the controller deactivates the alert at the calculated time point.

5. The rear-side alert system of claim 1, wherein the controller deactivates the alert when the object does not pass through the first boundary or the second boundary within a preset time after outputting the alert.

6. The rear-side alert system of claim 1, wherein the controller sets the alert deactivation line when the object passes through the first boundary or the second boundary within a preset time after outputting the alert.

7. The rear-side alert system of claim 1, wherein the controller sets the alert deactivation line by increasing or decreasing the preset distance according to a length of the detected object.

8. The rear-side alert system of claim 1, wherein the controller determines that there is the possibility of collision when an intersection between the moving path of the object and at least one of the first boundary or the second boundary is located in an alert area set in at least one of a first direction or a second direction from the location of the host vehicle.

9. The rear-side alert system of claim 1, wherein the controller determines the possibility of collision when an angle between the moving path of the detected object and the first boundary or the second boundary is larger than or equal to a preset angle.

10. A method of controlling a rear-side alert system, the method comprising:
    detecting an object moving around a host vehicle;
    generating a moving path of the object;
    determining a possibility of collision between the host vehicle and the object, based on the moving path of the object and at least one of a first boundary set on one side of the host vehicle or a second boundary set on the other side of the host vehicle;
    outputting an alert when there is the possibility of collision between the host vehicle and the object;
    setting an alert deactivation line spaced apart from the first boundary or the second boundary by a preset distance after outputting the alert; and
    deactivating the alert, based on the alert deactivation line and at least one of a location or a movement speed of the object.

11. The method of claim 10, wherein the deactivating of the alert comprises deactivating the alert when it is detected that the object reaches the alert deactivation line after outputting the alert.

12. The method of claim 10, wherein the deactivating of the alert comprises:
    acquiring the movement speed of the object at a moment when the object passes through the first boundary or the second boundary after outputting the alert;
    calculating a time point at which the object reaches the alert deactivation line, based on the acquired movement speed; and
    deactivating the alert at the calculated time point.

13. The method of claim 10, wherein the deactivating of the alert comprises deactivating the alert when the object does not pass through the first boundary or the second boundary within a preset time after outputting the alert.

14. The method of claim 10, wherein the deactivating of the alert comprises setting the alert deactivation line by increasing or decreasing the preset distance according to a length of the detected object.

* * * * *